United States Patent [19]

Rashwan et al.

[11] Patent Number: 5,766,524
[45] Date of Patent: Jun. 16, 1998

[54] RECLAMATION OF LEFTOVER CONCRETE

[75] Inventors: Mohammed M. S. Rashwan; Seman M. AbouRizk, both of Edmonton, Canada

[73] Assignee: Governors of the University of Alberta, Edmonton, Canada

[21] Appl. No.: 543,429

[22] Filed: Oct. 16, 1995

[51] Int. Cl.$^6$ .................................................. B28B 7/10
[52] U.S. Cl. .................... 264/37; 264/140; 264/152; 264/162; 264/313; 264/334; 264/DIG. 69
[58] Field of Search .......................... 264/162, 37, 140, 264/152, 313, 334, DIG. 69

[56] References Cited

U.S. PATENT DOCUMENTS

| | | | |
|---|---|---|---|
| 2,603,850 | 7/1952 | Dubbs et al. | 264/37 |
| 4,067,941 | 1/1978 | Gaudelli et al. | |
| 4,154,671 | 5/1979 | Berges. | |
| 4,402,890 | 9/1983 | Offenhausen et al. | 264/37 |
| 4,477,397 | 10/1984 | Helser | 264/37 |
| 5,096,648 | 3/1992 | Johnson et al. | |
| 5,238,195 | 8/1993 | Knez, Jr. | 264/37 |
| 5,433,903 | 7/1995 | Hauser et al. | 264/37 |
| 5,445,330 | 8/1995 | Rashwan et al. | |

Primary Examiner—Karen Aftergut
Attorney, Agent, or Firm—C. A. Rowley

[57] ABSTRACT

A method and apparatus for recovering concrete returned to the plant by delivery truck empties the delivery trucks into hoppers that dispense the so delivered left over concrete into molds designed to produce blocks of concrete suitable for regrinding into aggregate. The molded blocks are held in the molds for sufficient time to set the concrete for grinding before the blocks are separated from the molds. The molded blocks are then delivered to a grinding station where they are ground into aggregate of selected size for return to the concrete mixing operation. Any water that separates during the molding operation is subject to a settling operation to settle fine particles and the decanted water is then stored in a suitable reservoir for reuse, for example, in washing out the trucks.

6 Claims, 4 Drawing Sheets

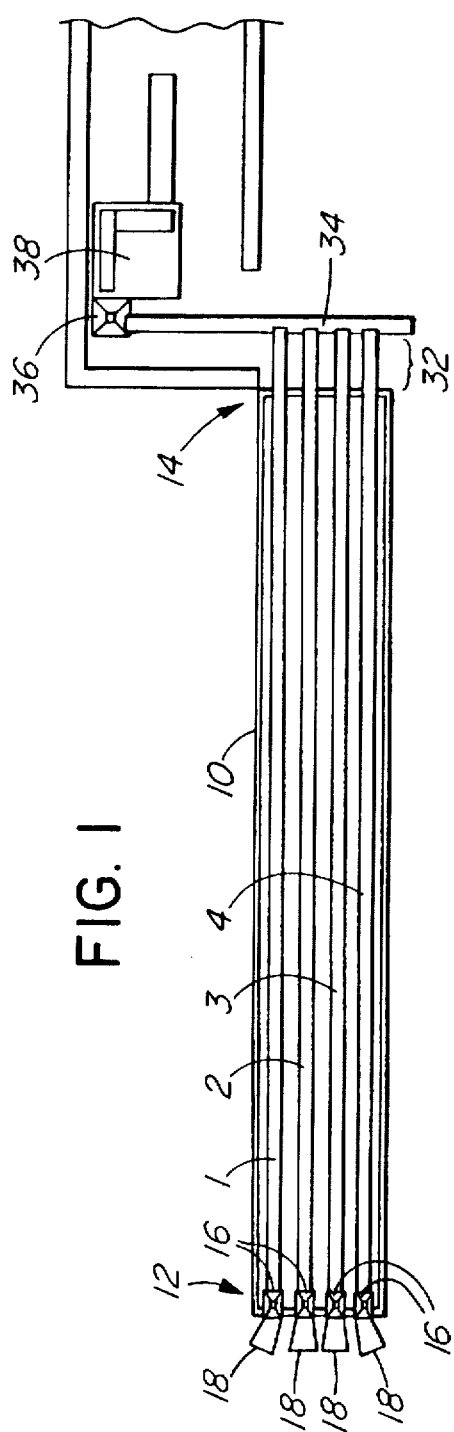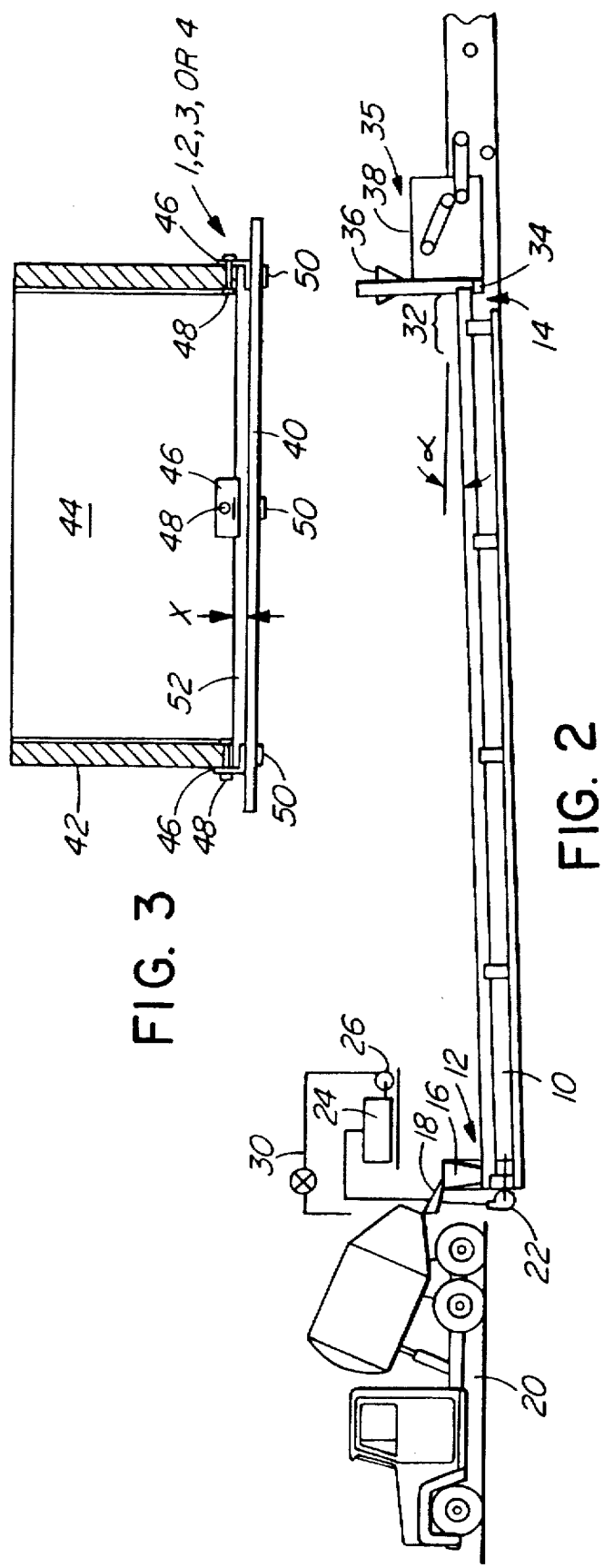

RECLAMATION OF LEFTOVER CONCRETE

FIELD OF INVENTION

The present invention relates to reclamation of leftover fresh concrete, more particularly, the present invention relates to a process and apparatus for reclaiming excess concrete as aggregate for subsequent utilization.

BACKGROUND OF THE INVENTION

Concrete returned to mixing plants is either disposed off, generally in a not too favorable ecological manner or attempts are made to reclaim as much of the material as possible.

Generally, the disposal process involves wetting down the concrete to significantly dilute it, generally within mixing truck itself and then dump the wet concrete. This sloppy concrete is held in a wet concrete bin for a period of time, generally in the order of about five days, during which the particulate separates from the water. The excess of water retards hydration and thus, after five days, the particulate material has not solidified into a solid mass. After separation of the excess water, the solid particular material is moved to an outdoor drying bin and after about two to four days, the dried material is transported to a landfill site.

Processes for attempting to recover concrete are directed to recovery of the concrete aggregate. To accomplish this, the leftover concrete is generally diluted or sprayed with high volumes of water to wash the aggregate which is also subject to a screening to segregate particulate material that remains after the washing by size, i.e. generally, on the return of the truck the returned concrete is diluted within the mixer, then poured onto screens and continually hosed down to wash and screen the aggregate into different sized particles.

U.S. Pat., 4,154,671 issued May 15, 1979 to Borges, describes a process of this nature, wherein the aggregate is diluted, washed and separated as above described and the dilution and wash water is then directed to a settling tank wherein the fines separate therefrom so that the water may be reused. The fine particulates are disposed of in some other way, generally as landfill.

There are also many techniques for molding concrete blocks or slabs and for automatically releasing these molded concrete products from the molds after they have set for a selected period of time, i.e. at least sufficient to retain their shape. One said process and apparatus for producing slabs from poured concrete is shown in U.S. Pat. No. 4,067,941 issued Jan. 10, 1978. In this process, the molds are open to release the molded product after a predetermined setting time.

U.S. Pat. No. 5,096,648 issued Mar. 17, 1992, to Johnson et al. discloses a mold system for producing paving stones and employing a plurality of slidably mounted molds.

In such molding systems, care is taken in extracting the molded product from the mold, since the prime purpose of these systems is to ensure that the molded product meets certain characteristics as the molded product is at least a major component of the end product to be sold. Thus, the extraction system for extracting the product from the molds is relatively time consuming.

BRIEF DESCRIPTION OF THE PRESENT INVENTION

It is an object of the present invention to provide a method and apparatus suitable for reclaiming leftover concrete.

It is a further object of the present invention to provide a conveyor for molding and releasing concrete block and feeding the so-formed concrete blocks to a grinder or breakdown system.

Broadly, the present invention relates to a method and apparatus for recovering leftover concrete in a delivery vehicle that has delivered its load but retains leftover concrete therein comprising moving said leftover concrete from said delivery truck into a hopper, metering the output flow of concrete from said hopper into a plurality of side by side molds, moving said molds along a path from said hopper to a dispensing station, dispensing molded concrete blocks from said molds after a hardening period in said molds sufficient to harden said concrete to form hardened concrete blocks that may be effectively ground in a grinding station, delivering said hardened concrete blocks to said grinding station and grinding said blocks into aggregate and reusing said aggregate in the manufacture of further concrete.

Preferably said hardening period will extend for between 6 and 24 hours.

Preferably said aggregate will be used to form fresh concrete within 6 days after said hardening period.

Preferably water is drained from said concrete during said hardening period and is collected for reuse.

Preferably, said molds will be formed on a belt conveyor by longitudinal and transverse wall segments mounted on an exposed surface of a belt forming a bottom of each said mold.

Preferably at least said longitudinal wall segments will be mounted with their bottom edges spaced from said belt by a distance sufficient for concrete to form interconnecting bridges between adjacent of said blocks.

Preferably, said dispensing station will include means for deforming said conveyor to facilitate separation of said blocks to separate from said molds and to break said interconnecting bridges, if present.

Preferably, said blocks will pass off the end of said conveyor as said conveyor belt turns around a return roll and wherein said transverse partitions separate as said blocks are transferred from said mold conveyor to a grinder input conveyor.

Preferably, said belt is deformed both laterally and longitudinally to cause cracking of said bridges between blocks and free said blocks from said transverse wall segments.

BRIEF DESCRIPTION OF THE DRAWINGS

Further features, objects and advantages will be evident from the following detailed description of the preferred embodiments of the present invention taken in conjunction with the accompanying drawings in which;

FIG. 1 is a plan view of a typical layout of the present invention incorporating a plurality of molding conveyors in side by side relationship.

FIG. 2 is a side elevation of the system shown in FIG. 1, showing a typical mixing and delivery truck (enlarged) in unloading position delivering returned concrete to a hopper at the in feed and of the molding system.

FIG. 3 is a section illustrating the mounting of the mold partitions and their spacing from the conveyor belt.

DESCRIPTION OF THE PREFERRED EMBODIMENTS

Figure 4:
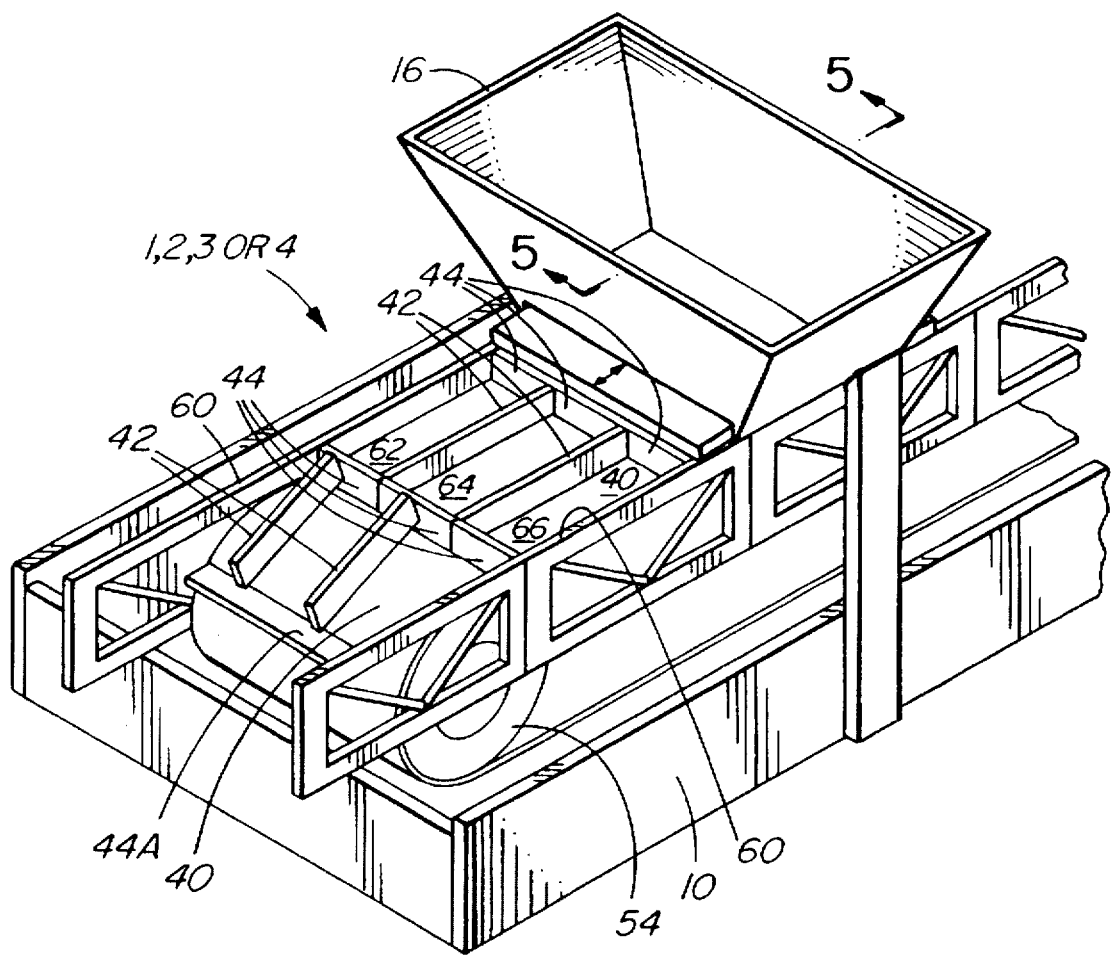
FIG. 4 is a schematic illustration of the in feed end of the mold conveyor showing the molds being formed and passing into the molding position underneath the hopper at the in feed end of the system.

The broad concept of the present invention is illustrated in FIGS. 1 and 2. The plan view in FIG. 1 shows four conveyors, 1, 2, 3 and 4 mounted on a main support forming part of a trough or sump system 10 that collects water draining from the concrete on the conveyors 1, 2, 3, or 4. The provision of four conveyors is simply a matter of convenience and the number of conveyors 1, 2, 3 and 4 may be more or less and will be selected to accommodate the size of the plant and to better ensure that none of the trucks are standing for any significant length of time waiting for an opportunity to dump their returned unused concrete.

All of the systems are essentially the same, the description of one will apply to all four illustrated conveyors 1, 2, 3 and/or 4.

Each of the conveyors extends from an input end 12 to a discharge end 14. At the input end 12 of each of the conveyors 1, 2, 3 and 4 there is a hopper 16 into which the returned unused concrete is directed via an input chute 18 from a truck such as the truck 20 shown in FIG. 2. If desired a central hopper may be used instead of a separate hopper for each conveyor, but if so special provisions must be made for receiving concrete, preferably simultaneously from more than one truck and for metering delivery from the central hopper to each of the conveyors 1, 2, 3 and/or 4.

The water draining from the wet concrete on the conveyors 1, 2, 3 and 4 into the trough 10 as above described, generally has a residence time within the trough 10 sufficient for sedimentation to take place so that the fine particles carried in the water drained into the sump 10 settle to the bottom of the sump providing decanted water thereabove. This water pumped via a pump 22 to a holding tank 24 from which it may be pumped via the pump 26 and line 30 to be used for washing out any residual sediment remaining in the trucks after they have been discharged (dumped) into the hopper(s) 16. Generally, after the truck is washed out, the wash water is emptied via a suitable line (not shown) and returned to the sump 10 for sedimentation and reuse.

At the output end 14 of each of the conveyors 1, 2, 3 and 4, there is a dispensing station 32 where molded concrete blocks 86 (see FIGS. 6, 7 or 8) formed in molds on the conveyors 1, 2, 3 or 4 are separated from their molds as will be described in more detail hereinbelow and are delivered onto a feed conveyor 34 which carries the blocks 86 to a grinding station 35. In the illustrated arrangement the conveyor 34 extends transverse to and thus, picks up the blocks 86 dispensed from each of the conveyors 1, 2, 3 and 4 and carries them to an in feed hopper 36 of a grinder or the like 38 in the grinding station 35.

The grinder 38 grinds the concrete blocks 86 and segregates the ground material into different size aggregate in known manner. A suitable system for grinding the concrete blocks to reduce them to particulate suitable for aggregate for future concrete production, is described in U.S. Pat. No. 5,445,330 issued Aug. 29, 1995 to Rashwan and Burrows.

Referring now to FIG. 3, as shown, each of the conveyors 1, 2, 3 and 4 is a belt conveyor having a main belt 40 on which longitudinal partition wall segments 42 and transverse partition wall segments 44 are mounted. Each of these partition segments or panels is mounted from the conveyor 40, for example, by an angle member 46 having one leg fixed to the partition panel 42 or 44 adjacent to the bottom thereof via a bolt or the like 48 and the other leg fixed to the belt 40 via a second bolt or rivet or the like 50. In the illustrated arrangement, both the partitions 42 and 44 are spaced above the belt 40 to provide an open spaced 52, having a height dimension, i.e. spacing from the belt 40 equal to X wherein X will normally be in the range of between about 0 to ¾ of an inch and generally will be between ¼ and ⅝ of an inch. The main reason for the gap or space 52 is for maintenance and cleaning.

In the preferred arrangement, the transverse partitions 44 are not spaced from the belt 40 i.e. X =0 whereas the longitudinal partitions 42 are preferably spaced from the belt 40 by a distance X generally equal to between ¼ and ¾ of an inch, preferably ¼ and ⅝ of an inch.

Figure 6:
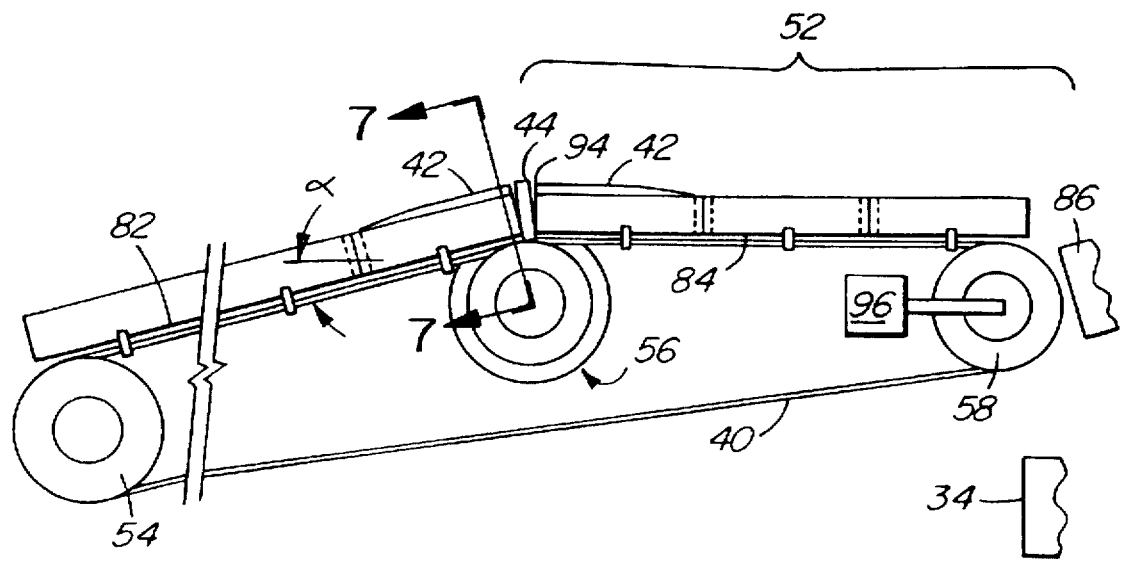
FIG. 6 is a side elevation schematically illustrating the dispensing system including the concrete bridge cracking or breaking section.

The pins or bolts 48 and 50 are usually positioned at about the longitudinal center of the longitudinal partitions 42 to facilitate movement of the partition panels 42 around the pulley or roll such as the rolls 54, 56 and 58 (see FIGS. 4 and 6).

In the embodiment shown in FIG. 4, each of the conveyors 1, 2, 3 and 4 has side decks 60 positioned at each lateral edge of the conveyor and is formed with three side by side mold cavities 62, 64 and 66 separated along their sides by longitudinal partition wall segments 42 and at their axial ends by transverse partition wall segments 44. If desired outside longitudinal partition wall segments may be provided to form the outside walls of the outside mold cavities 62 and 64 in place of the decks 60, but if so guide means will probably be required to maintain and support these wall segment from lateral deflection. As seen from FIG. 4, these mold cavities 62, 64 and 66 are set up or formed as the partition panels or wall segments 42, travel around the input end roll 54.

In the illustrated arrangement of FIG. 3 and in one location in FIG. 4, there is a separate transverse partition wall segment panel 44 for each of the mold cavities, 62, 64 and 66. However, as indicated to the left of FIG. 4, a single unitary transverse panel 44A may replace the three wall segments or panels.

While three cavities are arranged in side by side relationship transversely of the conveyor 40 have been shown in FIG. 4, it is obviously possible to use only a single longitudinal divider or series of wall segments 42 and two cavities or more than two dividers and thus have a greater number cavities arranged transversely to the conveyor 40. However, three have been found to be a reasonable and effective number.

The length, width and depth (thickness of the molded block 86) of each of the cavity is chosen to ensure that the ultimate size of the block can be handled by the grinder and that there is sufficient weight in the block 86 to ensure that it will break free of the conveyor 40 and the partition walls 42 and 44 in the release or dispensing station 32.

Figure 5:
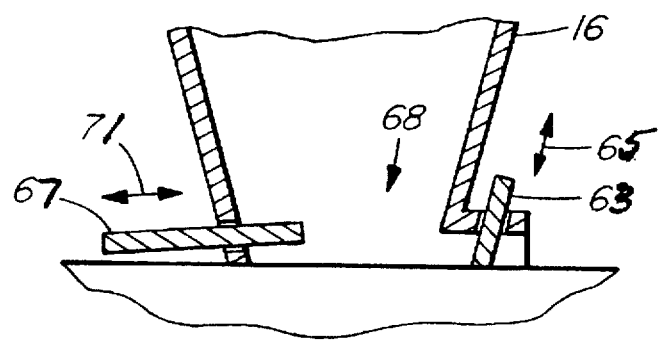
FIG. 5 is a partial section along the lines 5—5 of FIG. 4 showing the outline end of the hopper.

As shown in FIGS. 4 and 5, the hoppers 16 are each provided with a front wiper gate 63 which may be adjusted vertically as indicated by the arrow 65. Normally, the walls 42 and 44 project above the belt 40, the same distance and the wiper gate 63 is positioned to wipe across the tops of the partition wall segments 42 and 44 to ensure that the concrete does not extend significantly above the height of the partition wall segments 42 and 44 and form top bridges similar to the bridges 90 or 92 between the molded blocks 86 as will be described below. Thus, the thickness of the molded blocks 86 is determined by the height of the partition walls 42 and 44.

It may also be desirable to adjust the rate of flow out of the hopper 16 or to stop the flow and for this reason, a baffle 67 that may be slid as indicated by the arrow 71, across the outlet from the hopper 16 indicated by the arrow 68. The position of the baffle 67 is used to adjust the output of the hopper 16 in accordance with the speed of the conveyor 40.

Any suitable mechanism may be used for adjusting the position of the wiper 63 and the baffle or plate 67, for example, hydraulic cylinders.

Each of the mold cavities is filled with concrete as it passes under the hopper 16 then continues travels along with the conveyor 1, 2, 3 or 4 from the input end 12 to the output end 14, generally over a hardening time period sufficient for adequate hardening of the concrete so that it may be properly disintegrated in the grinding station 35 (i.e. so that the hardened concrete blocks so formed though they may fracture into several pieces do not crumble when they fall onto the conveyor 34) Generally the hardening period will require of at least 6 hours and less than 24 hours. As is well known hardening time may be adjusted by incorporating additives into the wet concrete.

It has been found that if the concrete is permitted to set or harden as above described (generally between 6 and 24 hours), is then ground and the ground material is used as aggregate for a further batch of concrete, and the further batch of concrete is made within 6 days of completion of the hardening period the so produced concrete has better strength characteristics than similar concrete made using an equivalently sized and an amount of fresh aggregate.

Figure 7:
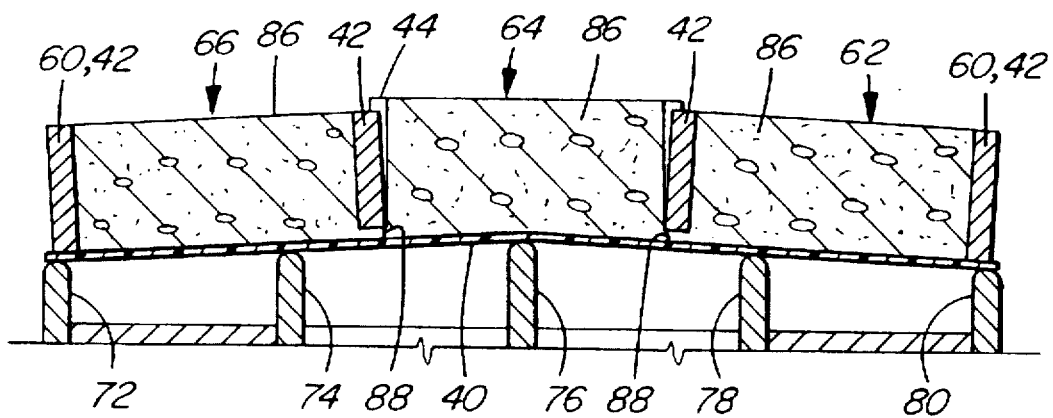
FIG. 7 is a section along the line 7—7 of FIG. 6.
Figure 8:
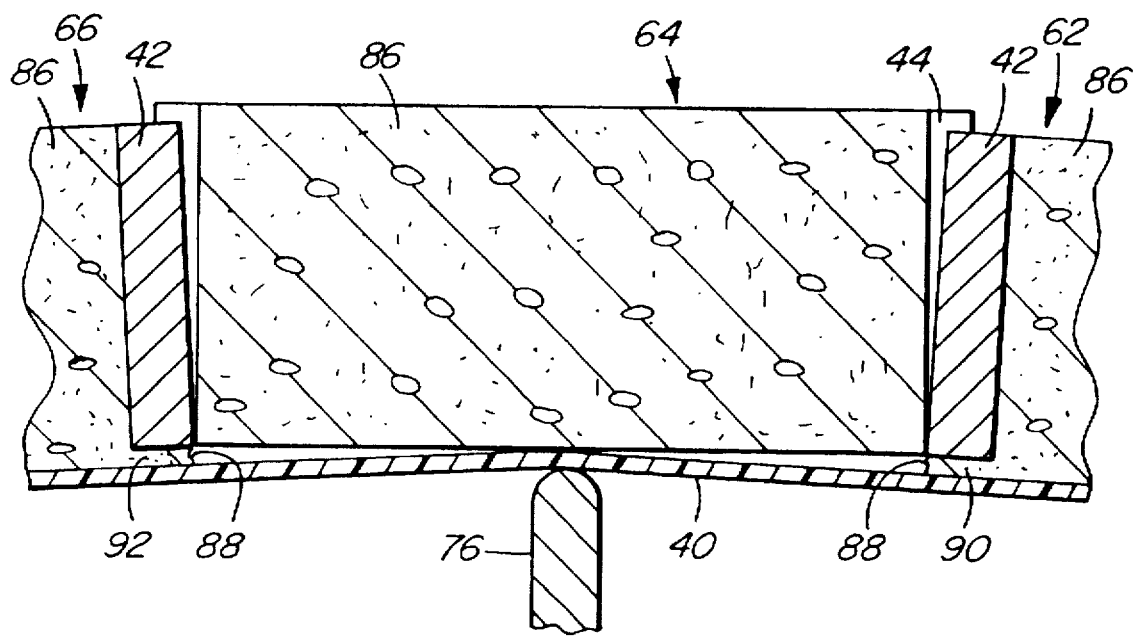
FIG. 8 is an enlarged section of the central portion of FIG. 7.

The dispensing section 32 includes a system to facilitate separation of the blocks 86 from the molds 62, 64 and 66. In the illustrated arrangement a crowned roll or wheel section 56 indicated by the wheel 56 which in the illustrated arrangement is formed by a shaft 70 having discrete wheels or the like 72, 74, 76, 78 and 80. The outer pair wheels 72 and 80 are essentially the same diameter as are the intermediate pair of wheels 74 and 78 but the intermediate pair of wheels are larger in diameter than the wheels 72 and 80 and are smaller in diameter than the center wheel 76. The differences in diameters of the outer wheels 72 and 80 intermediate wheels 76 and 78 and center wheel 76 causes the conveyor 40 to bow as indicated in FIG. 7 and cause the center of the span of the conveyor to be above the side edges thereof. This causes the concrete block 86 formed in the center mold 66 to rise above the blocks 86 formed in the outside molds 62 and 64 as shown in FIGS. 7 and 8 molds thereby facilitating separation of the blocks 86 and breaking, as indicated by the fracture lines 88, the concrete bridges 90 and 92 (if present) formed under the partitions 42 and joining the block 86 in the central mold 64 with the blocks 86 formed in the outside molds 62 and 66 respectively. (see FIG. 8). The bridges 90 and 92 may break simultaneously or in sequence, if one of the bridges 90 or 92 breaks first the weight of the center block 86 on the opposite side of the crown will cause the remaining bridge to be broken.

Similarly, the direction of travel of the conveyor is altered in the zone 32 by the crowned wheel 56 so that the incoming conveyor section indicated in FIG. 6 as section 82, extends at an angle α to the outgoing section 84. The angle α is normally in the order of 5 to 20° with the section 84 preferably being substantially horizontal.

Movement around the crown roll 5 causes the direction change of the conveyor belt 40 by α° also causes separation of the transverse partition walls 44 from the ends of the longitudinal partitions 42 and separation from the ends of the blocks 86 as indicated by the gaps 94 (see FIG. 6).

The blocks move off the conveyor as the belt 40 turns with the return roll 58 but only after the leading flights or transverse walls 44 move out of the way and then the blocks 86 drop onto the conveyor 34 and as above indicated, are transferred to the grinding station 35.

Belt 40 may be driven by any suitable means such as the drive motor 96 driving the return wheel or roll 58. In the illustrated arrangement, no flights are shown along the bottom run of the conveyor since in some embodiments, the flights 42 and 44 only extend partially along the length of the conveyor 40 and are intended to be indexed into position at the appropriate time at the beginning of the shift and gradually move to the outlet position 14 over the course of the day and then during the night, when there is no concrete being returned. Obviously, it is also possible to put molds along the full length of the conveyor. The conveyor speed is controlled in accordance with the demand, i.e. the amount of return concrete available and to provide the required minimum residence time in the molds.

In any event, it is always necessary to retain the blocks in the molds for hardening period of at least sufficient time to harden the concrete to a degree to form hardened blocks that may be transferred to the conveyor 34 without crumbling and may be effectively ground in station 35 which generally requires at least about 6 hours and to deliver these blocks to the grinder preferably in less than 24 hours so that the blocks may be reground to form aggregate. As above indicated for best results the aggregate so formed should be used to produce further (fresh) concrete within 6 days commencing at the termination of hardening period.

From time to time, the sediment that collects within the sump 10 must be removed and is generally disposed off in land site as is currently the practice.

Figure 9:
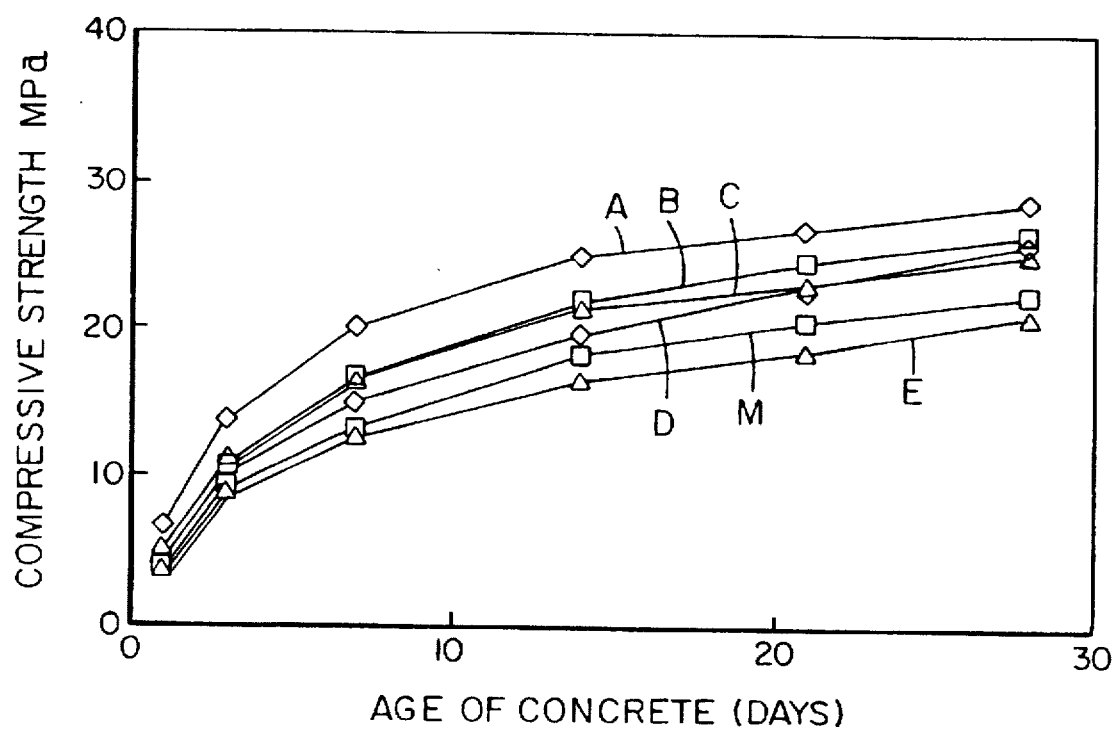
FIG. 9 is a graph of strength of concrete made with the returned concrete mix as compared with a controlled mix, showing the age of the concrete versus compression strength for different storage times.

In a test to determine the effectiveness of the recycled aggregate, a recovered aggregate of a selected size distribution was used in making concrete which was compared with a control concrete made of good quality new aggregate of the same size distribution. As shown in FIG. 9, concrete containing recycled aggregate stored for one day as indicated by the curve A, had a higher strength than the control concrete indicated by the curve M. When the aggregate was stored for two days as indicated by the curve B, it was still capable of producing a higher strength concrete than the control, as was aggregate stored for three days and six days (curves C and D). However, when the aggregate was stored for seven days, and then used to make concrete, the concrete so formed did not reach the strength of the concrete as can be seen from curve E.

Thus, it is clear that the recycled aggregate produced in accordance with the present invention should preferably not be stored for more than about six days, i.e. from the time of pouring to the time of introducing the ground recycled aggregate into concrete should not exceed about six days. It is preferred to grind the material within 24 hours of it being poured. However, it is obviously essential that the concrete set to produce the harden block 86 before it is ground and this only takes about 6 to 10 hours minimum. If the aggregate is not used in the preferred time period it is still quite effective as an aggregate though in some cases it may not be superior to conventional fresh aggregate Having described the invention, modifications will be evident to those skilled in the art without departing from the scope of the invention as defined in the appended claims.

We claim:

1. A method for recovering concrete returned in a delivery vehicle that has delivered its load but retains leftover concrete therein comprising moving said leftover concrete from said delivery vehicle into a hopper, metering an output flow of said leftover concrete from said hopper into a plurality of side by side molds, moving said molds along a path from said hopper to a dispensing station over a hardening time period during which time period molded concrete blocks are formed in said molds from said leftover concrete, said hardening time period extending for between 6 and 24 hours, dispensing said molded concrete blocks from said molds in a dispensing station after said hardening time period in said molds has passed sufficient to harden said leftover concrete to form hardened concrete blocks that are effectively ground in a grinding station, delivering said hardened concrete blocks to said grinding station and grinding said blocks into aggregate and reusing said aggregate in the manufacture of fresh concrete within 6 days after said hardening time period.

2. A method as defined in claim 1 wherein water is drained from said leftover concrete during said hardening time period and said water so drained is collected for reuse.

3. A method as defined in claim 1 wherein said dispensing includes deforming said molds in said dispensing station to facilitate separation of said blocks from said molds.

4. A method as defined in claim 3 wherein at least longitudinal sides of adjacent of said molded blocks are formed with interconnecting bridges therebetween.

5. A method as defined in claim 4 wherein said deforming is sufficient to break said bridges.

6. A method as defined in claim 1 wherein said delivering passes said blocks directly from said dispensing station to an in feed conveyor of said grinding station.

* * * * *